April 25, 1961 G. E. C. RANDELL ET AL 2,981,423
CHARGING HORIZONTAL COKE OVENS
Filed Dec. 9, 1958 7 Sheets-Sheet 2
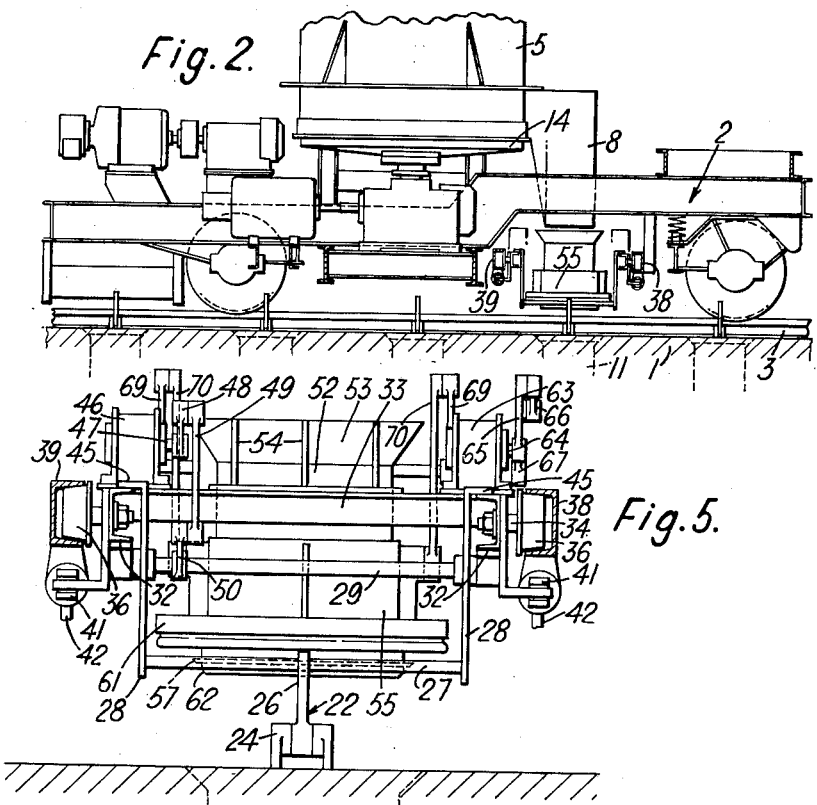
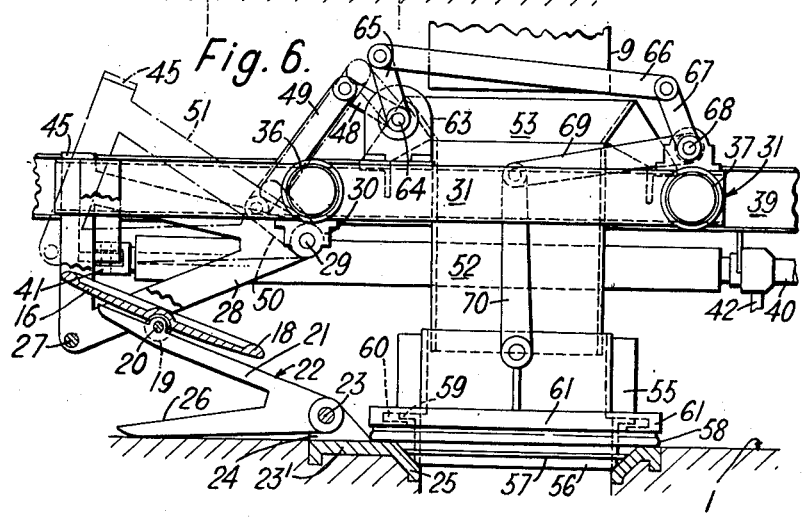

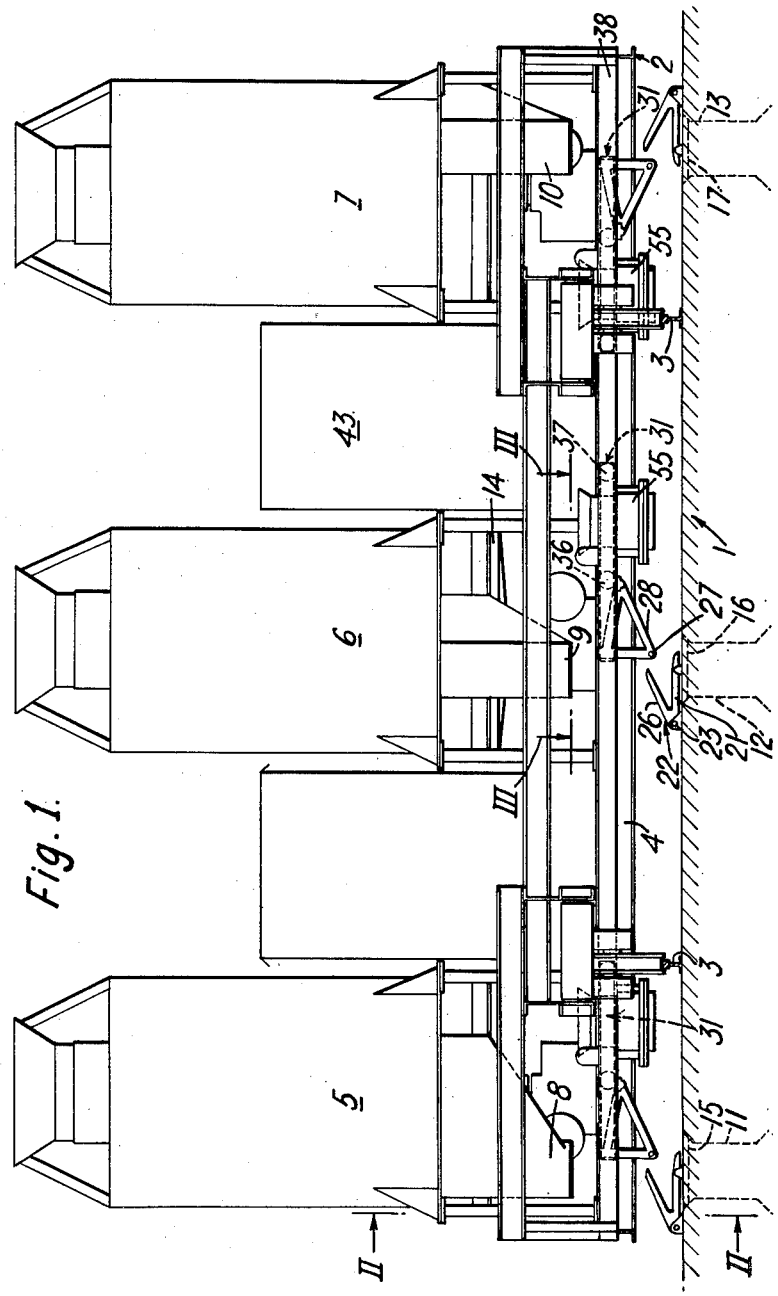

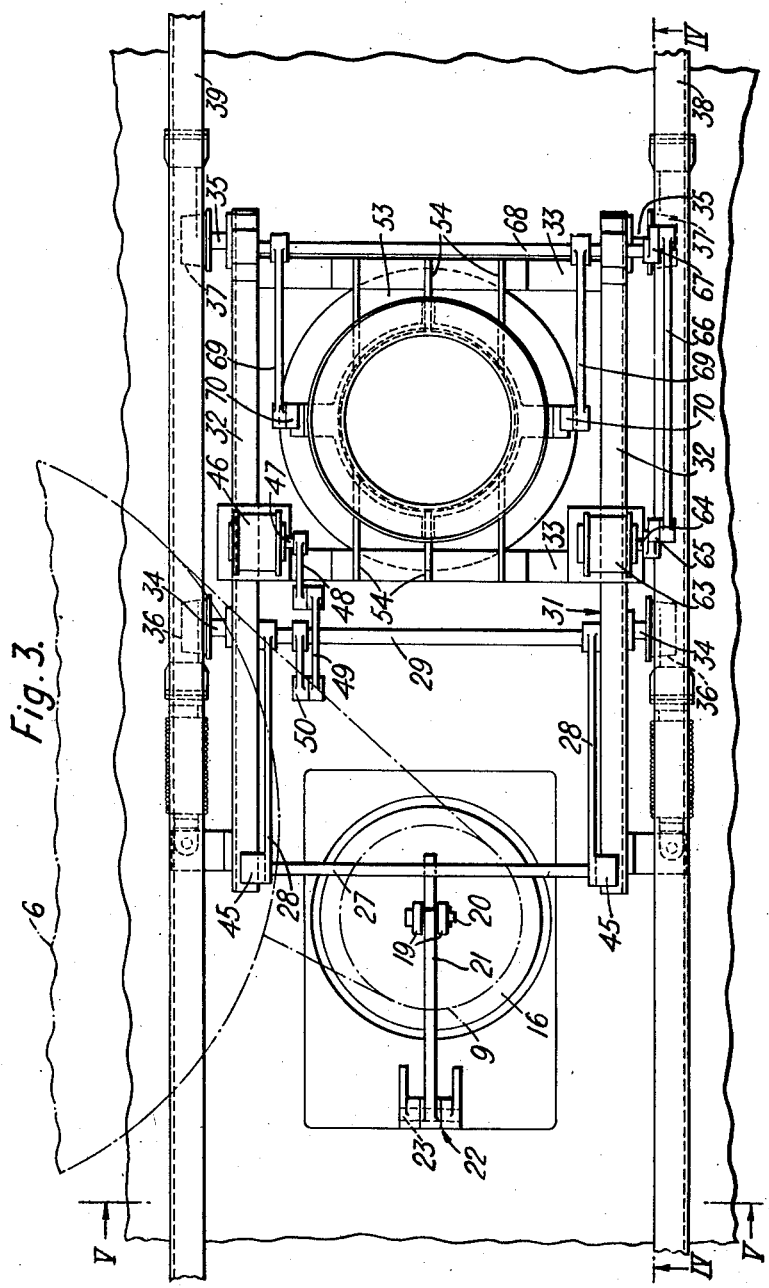

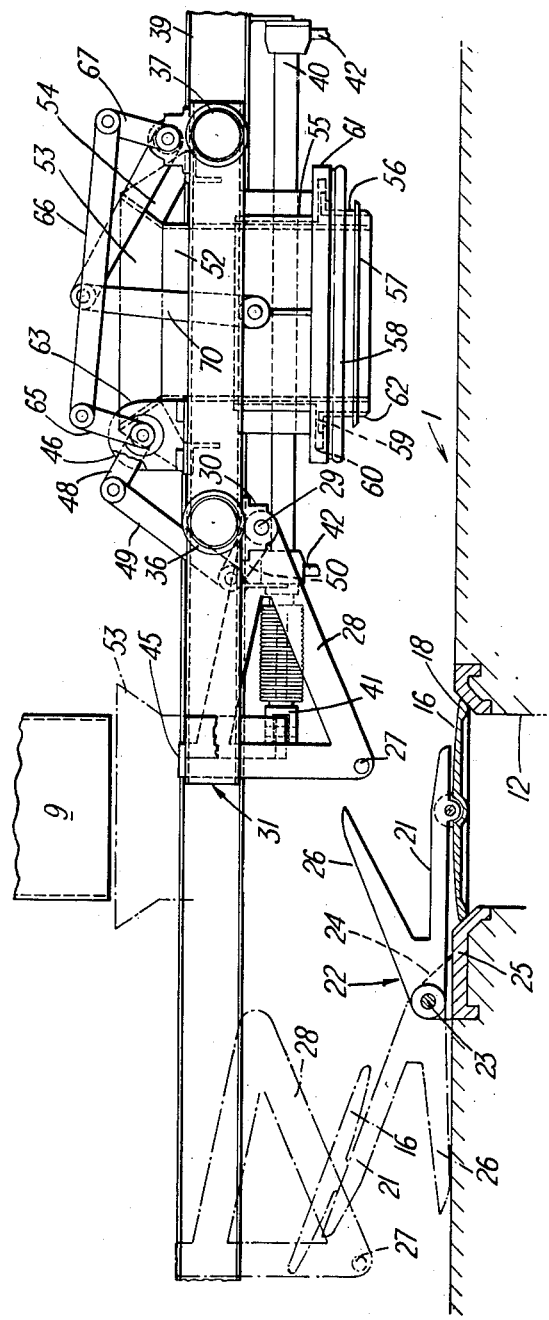

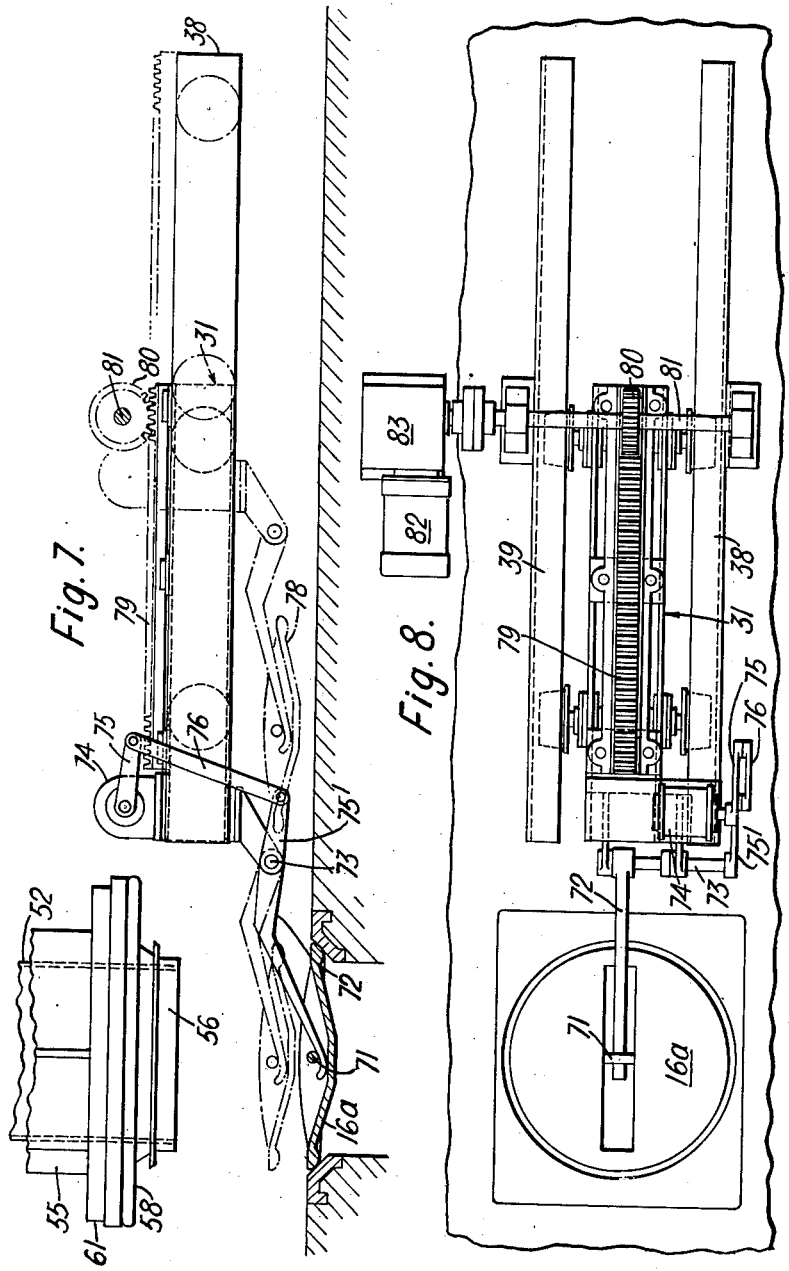

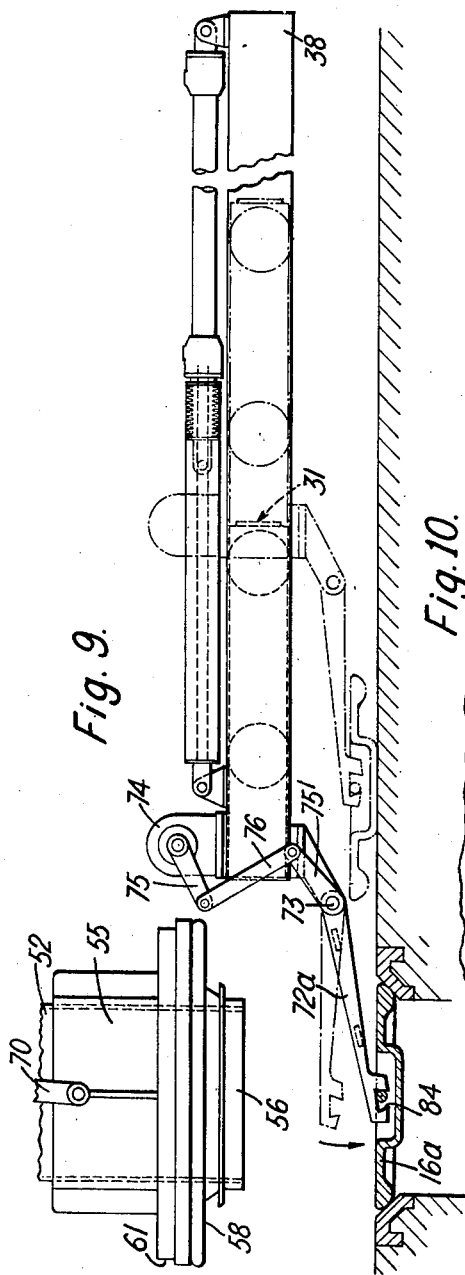
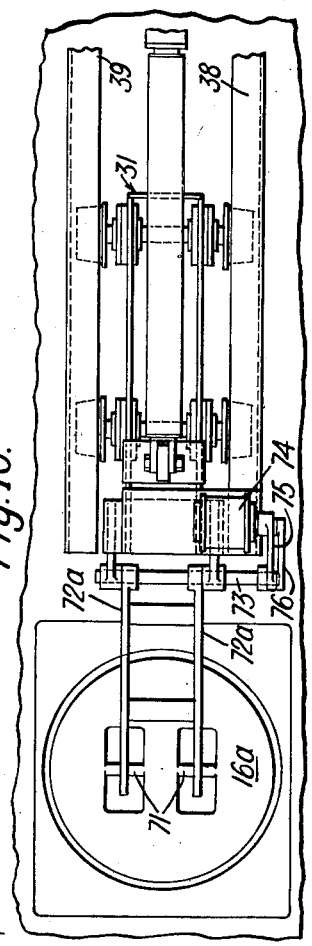

United States Patent Office 2,981,423
Patented Apr. 25, 1961

2,981,423

CHARGING HORIZONTAL COKE OVENS

Geoffrey Edward Charles Randell and Herbert Milton Whitworth, London, England, assignors to Woodall-Duckham Construction Company Limited, London, England, a British company Filed Dec. 9, 1958, Ser. No. 779,239

Claims priority, application Great Britain Dec. 16, 1957

8 Claims. (Cl. 214—18)

This invention concerns improvements in or relating to the charging of horizontal coke ovens, intermittent vertical chambers, static vertical retorts, gas producers, refuse destructors, furnaces and like installations wherein the charging of material is achieved through charging holes in the tops of the installations from charging or larry cars travelling thereover, the charging holes being provided with individual lids or covers which have to be opened or removed to permit of the charging of the installation and subsequently closed or replaced after such charging has been effected.

A horizontal coke oven battery is typical of the kind of plant or installation to which this invention is applicable and the invention will hereinafter be described entirely with reference to such battery since it is primarily intended for use in this connection; nevertheless it should be understood that the invention may, as indicated above, be applied to other installations of analogous character and where similar requirements and conditions apply.

The individual ovens of a horizontal coke oven battery are charged with coal by introducing the same through charging holes in the tops of the ovens, each oven usually having a plurality of such charging holes disposed at intervals along its length. The coal to be charged into an oven is carried in the containers or hoppers of a larry or charging car (hereinafter called a "larry car") running on rails over the top of the battery of ovens, a complete charge for one oven being carried in the said containers and being introduced into an oven through the charging holes thereof after bringing the discharge chutes of the containers into close proximity and registration with the charging holes of the oven to be charged.

The charging holes of the oven are closed at their upper ends by individual lids or covers (hereinafter called "lids") each seating in the flared mouth of its respective charging hole and these lids are usually sealed or luted into their charging holes after being placed therein.

The number of charging holes per oven varies from battery to battery and there may, for example, be two, three, four, or five or more charging holes or only one, but for the sake of convenience, but by no means by way of limitation, it will be assumed herein that an oven in furnished with three charging holes spaced from one another longitudinally of the oven.

The oven charging and discharging routine often employed is as follows:

Assuming that a charged oven has been "coked," then the oven is taken "off the main" which involves closing the main valve or valves leading from the oven to the gas main or mains of the oven and opening the cap or caps on the ascension pipe or pipes and then venting the oven by opening one of the charging holes by removing its lid so that air is drawn across the top of the charge in the oven to burn up any gas which possibly may be still being produced. Venting the oven also ensures that, over a period of time, the complete removal of roof carbon from, or "scurfing" of, the oven top will be achieved by the air drawn through the gas space thereof, such scurfing being predominantly effected after the oven has been pushed as later explained.

The doors at the two opposite horizontal ends of the oven are, of course, removed at the appropriate time by the door operators at the pusher and coke-sides of the battery respectively and, after the removal of a charging lid as above explained, the oven is pushed; then the oven doors are replaced and the main part of the oven scurfing is completed while the lids and caps are opened by the method above described.

The larry car, filled with coal, is then brought over the oven, the discharge chutes of its containers are registered with the charging holes of that oven, and the ascension pipe necks and their associated steam jets are cleaned. The remaining charging hole lids of the oven are now removed.

Usually two operators are employed for dealing, amongst other things, with the opening and closing of the gas collecting main valve or valves leading to the gas main or mains communicating with the oven, for opening and closing the ascension pipe cap or caps, the adjustment of the larry car, and for removing and replacing the charging hole lids.

To effect removal of the first charging hole lid and the subsequent removal of further lids, one of the operators walks along the top of the oven and, by means of a heavy tool having a hooked end rather in the nature of a shepherd's crook, imparts a blow to one edge of each lid to be removed thereby cracking the seal or luting around the lid and tilting the lid in the flared mouth at the upper end of the charging hole; and then by engaging the hooked end of the said tool with a part of the appropriate lid the operator withdraws the lid approximately horizontally to one side of the charging hole, uncovering the latter, whereafter the lid is left lying on top of the battery.

On completion of the removal of the charging lids, the steam jets on the ascension pipes are opened to draw off gas and smoke from the oven and the oven is charged from the larry car containers, one of the operators being on the larry car to open the gates of the containers and to control this charging operation whilst the other operator remains on the battery top to service the charging operation and subsequently to replace the charging hole lids and perform other duties.

Levelling of the charge in the oven is now effected by means of the usual leveller bar provided on the pusher machine. The charging hole lids are replaced manually in the charging holes and the larry car moved away from the oven, any coal spilled on top of the oven being swept by the operator in charge on to the charging lids and the latter tilted to deposit the spillage into the oven, whereafter the charging lids are luted into the charging holes.

In order to minimize the emission of smoke through the charging holes, it is usual to replace the charging lids as quickly as possible before moving the larry car away from the oven.

All the aforesaid freeing, removal and replacement of the charging hole lids from, and in, the charging holes entails considerable labour costs and the work is onerous, being hot, dirty and heavy and the atmosphere being, during the charging operations, often polluted with noxious gases escaping from the oven charging holes. Moreover, whilst the operators generally are very efficient, the work of removing and replacing the charging hole lids is not always performed with that precision that it is desirable to achieve in the charging of coke oven batteries. Furthermore, the spillage of coal around the charging holes by the containers of the larry car also involves a wastage of labour due to such coal having to be swept up and deposited into the charging holes.

It is therefore one object of this invention to provide a means of mechanising the removal and replacement of the lids of the charging holes thereby to release and reduce the labour force required hitherto for performing this work. A further object of the invention in certain of its forms is to facilitate the mechanical removal of one or more selected charging hole lids when required, for example where it is desired to carry out the scurfing of an oven as above described.

According to this invention there is provided, in or for a horizontal coke oven battery or like installation, a larry car having means for once spotting the same over the chambers for charging while permitting the removing of a charging hole lid of the chambers of such battery or installation, such means comprising mechanically operable lid handling means capable of moving the lid to one side of the charging hole and also replacing such lid in its charging hole when required.

By the expression "mechanically operable" lid handling means, is meant means for fulfilling the aforesaid lid removing and replacing operations automatically (e.g. by means operated hydraulically, pneumatically, electrically, or purely mechanically or by a combination of some of these alternative means) as distinct from performing such operations manually as above described.

Desirably the operations of the said lid handling means are reversible, whereby the same handling means may be employed for removing a charging hole lid from its charging hole and for replacing such lid.

Preferably there will be one of the said mechanical lid handling means for each charging hole lid to be removed and replaced, and desirably each such means will be independently operable and preferably by remote control by the larry car operator and from his normal station on the larry car.

In one embodiment of the invention the charging hole lid is carried by lever means pivotally mounted on the battery top to one side of the charging hole it is to close, such lever means being operable by trip means on the larry car for removing the lid from its charging hole and moving it aside from the latter, and for subsequently replacing the lid in its charging hole.

Thus, according to a further feature of the invention, each charging hole lid may be carried by a bell crank lever pivoted to the battery or installation, the arms of this lever being adapted to co-operate with trip means on the larry car and adapted to be advanced towards such bell crank lever to engage one arm thereof in order to raise and then invert the charging hole lid to one side of its charging hole ready for cleaning, said trip means also being adapted subsequently to co-operate with the other arm of said bell crank lever to replace the lid in its charging hole.

Preferably means will also be provided for rendering the said trip means inoperative on the said bell crank lever during the withdrawal of the trip means relative to the bell crank lever whereby the charging hole to which belongs the lid carried by said lever may be left open for scurfing or other purposes.

In other embodiments of the invention the said mechanically operable lid handling means comprises a lid removing and replacing member carried by the larry car and advanceable towards a charging hole laterally or transversely of the vertical axis of the charging hole for engagement with the lid thereof and then withdrawable transversely away from such charging hole to remove the lid therefrom, and vice versa.

Alternatively the said mechanically operable lid handling means includes means adapted to hook into the respective charging hole lids for lifting and transversely withdrawing the lids from their charging holes and for moving them aside from the latter, or an electro-magnet adapted to be engaged with a charging hole lid and means for raising the electro-magnet to remove a lid from a charging hole and for then moving or swinging it aside.

The relative movement required between the said mechanical lid handling means and the coke oven battery or like installation in order to achieve the transverse displacement of the charging hole lids aside from their charging holes and the subsequent transverse replacement of the lids in these holes may conveniently be attained by mounting the lid handling means or parts thereof, e.g. the said trip means, on auxiliary carriages which are reciprocable with respect to the larry car in a direction transverse to the vertical. Thus, for example, where the said bell crank levers and trip means are employed the movement of the said auxiliary carriages may be utilised to effect the necessary transverse movement of the trip members with respect to the co-operating bell crank levers.

Preferably all the said mechanical lid handling means for removing and replacing the independent charging hole lids are operable independently of one another, but means may be provided whereby they may be operated in unison.

A further object of the invention is to provide in combination with the said mechanically operable charging lid removing and replacing means, means for preventing or reducing the discharge of coal on to the top of the battery around the charging holes, with the consequential further reduction of the labour required in oven charging operations.

Thus, according to a further feature of the invention, a larry car as above referred to having containers for the material to be charged into the said charging holes with discharge outlets adapted to discharge into intermediate discharge chutes for registration or alignment with the charging holes, is furnished with extension trunks and means whereby these trunks can (a) be mechanically or automatically lowered into the charging holes with which their intermediate chutes are respectively aligned, in order to convey material from the containers directly into the charging holes without spillage therearound; and (b) subsequently be withdrawn from said charging holes.

Furthermore, each said extension trunk is preferably adapted to be self-sealing in the charging hole into which it is engaged and preferably also has means for effecting an annular seal around the charging hole on the top of the installation in which the charging hole is formed.

The intermediate chute and its extension trunk is carried on an auxiliary carriage on the larry car so that they may be moved transversely relatively to the discharge outlet of the container on the larry car into and out of axial alignment with the discharge outlet of said containers and with the corresponding charging hole after previous removal of the charging hole lid from such charging hole. Where the said mechanically operable lid handling devices for transversely removing and replacing the charging hole lids are carried by auxiliary carriages, the same carriages may also carry said intermediate chutes and trunks, but the latter will only be mounted on the same auxiliary carriages for the lid handling means for a charging hole to which simultaneous movement of its said chute into position for registration with the charging hole is desired.

Alternatively the said intermediate chutes and trunks may be carried on the containers themselves or directly on the larry car.

The control of the said mechanically operable lid handling devices, the means for controlling the movement of said auxiliary carriages where provided, and the means for raising and lowering the said extension trunks are preferably all operable from a single position, e.g. in the case of a horizontal coke oven battery, the control cab of the larry car.

By arranging for this transverse shifting of the charging hole lids from their charging holes to a location aside from such holes, provision is made in a simpler more economical and facile way for the clear entry of the extension trunks into the corresponding charging holes without interference by the lids.

Further objects of the invention will become apparent hereinafter.

In order that the nature of this invention may be more readily understood, various alternative embodiments of the same will now be described, by way of example, with reference to the accompanying drawings in which:

Figure 1 is a front elevation of a charging car in once spotted position relative to the charging hole lids of a horizontal coke oven battery having this invention applied thereto;

Figure 2 is a section on line II—II, Figure 1;

Figure 3 is a horizontal section on line III—III, Figure 1, drawn to an enlarged scale;

Figure 4 is a section on line IV—IV, Figure 3, showing the mechanism in a normal position preparatory to removing the centre charging hole cover;

Figure 5 is a vertical section on line V—V, Figure 3;

Figure 6 is a fragmentary view similar to Figure 4 but showing the mechanism in the position it occupies after the removal of the centre charging hole cover;

Figure 7 is a view similar to Figure 4 but illustrating another embodiment of the charging hole cover raising mechanism according to the invention;

Figure 8 is a plan of the mechanism shown in Figure 7, the charging trunk being omitted;

Figure 9 is a view similar to Figure 7 but illustrating still another embodiment of the construction there depicted;

Figure 10 is a fragmentary plan of the mechanism shown in Figure 9, the charging trunk being omitted;

Figure 11:
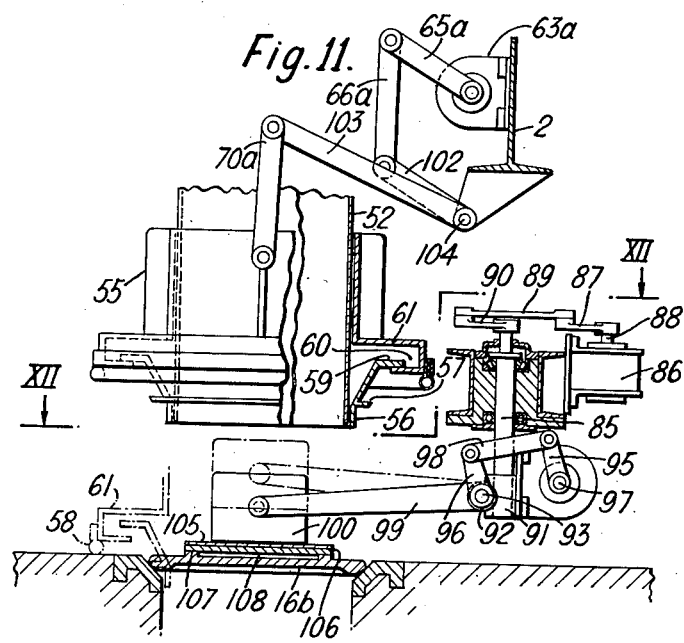
Figure 11 is a fragmentary vertical sectional view through a charging hole cover of a horizontal coke oven battery, the charging trunk of the charging car and an electro-magnetic charging hole cover handling mechanism constructed according to another embodiment of this invention.

For the purpose of the following description it will be assumed that the oven battery has three charging holes in the top of each of the oven chambers thereof, each such hole being furnished with a lid.

Referring to the drawings, and in particular Figures 1 to 6, it will be seen that in the embodiment of the invention there illustrated, the horizontal coke oven battery represented diagrammatically at 1 and that has mounted on its top a larry car generally depicted by the reference 2 and running on rails 3 carried by the top of the battery. The larry car comprises a horizontal oblong chassis 4 the length of which extends across width of the battery and on which chassis is rigidly supported three containers or hoppers 5, 6 and 7, each with a dependent discharge chute 8, 9 and 10 (Figures 1, 2 and 6) which are respectively adapted to register with the charging holes 11, 12 and 13 of any oven chamber of the battery 1 when the larry car is over such an oven. Coal is discharged from the containers 5, 6 and 7 mechanically by rotatable turntable or equivalent feed means 14 to the chutes 8, 9 and 10, preferably at a regulatable rate. It should be understood, however, that the invention may be applied to installations where the coal is discharged solely by gravity from the coal containers of the larry car and so the invention is not confined in its use to mechanically discharged containers.

In the embodiment of the invention illustrated in Figures 1 to 6 inclusive, the charging holes 11, 12 and 13 of each oven of the horizontal coke oven battery are each furnished with a circular lid, 15, 16 and 17, adapted to seat peripherally in the conical seat or flared upper end of the corresponding charging hole, the lid preferably having a peripheral bead 18 of rounded cross section (as clearly shown in Figure 6) for engagement with the said conical seat and the lid being adapted to be luted or sealed in such seat after being placed therein.

As the charging hole lid handling means for all the lids 15, 16 and 17 are substantially the same, only the mechanism for one such lid, namely the lid 16, will be described in detail.

A pair of upstanding lugs 19, Fig. 3, disposed centrally on the upper side of the charging lid 16 have pivoted between them, by a pivot pin 20 a part of one arm 21 of a double arm lid handling bell crank lever 22 of approximately V-shape, with its two arms located one above the other, and all in the vertical medial plane of the vertical centre lines of all the charging holes 11, 12 and 13 of the same oven.

At its apex or elbow each bell crank lever 22 is mounted for pivoting in the said vertical medial plane upon a horizontal pivot pin 23 supported in a bracket 24 carried rigidly upon the top of the battery to one side of the charging hole with which the lid 16 carried by the bell crank lever is intended to close, this bracket conveniently being carried by a radial lug 23', extending in the direction of the length of the oven on a metal reinforcing ring or lid frame 25 coaxially of the top charging hole in question and furnished with the aforementioned conical seat for the lid.

The second arm 26 of the bell crank lever 22 is uppermost when the associated charging lid 16 is closed, and is shorter than the arm 21. At certain stages in the operation of removing and replacing a charging hole lid, both the arms 21 and 26 separately co-operate with a trip member 27, and the arrangement being such that, to remove a lid from its charging hole, the shorter arm 26 of the bell crank lever 22 is engaged by the trip member 27 and the lever 22 pivoted about its pivot pin 23 to raise the charging hole lid, and swing it away to one side of the charging hole, and thus invert it for cleaning, the centre of the lid being moved aside from the charging hole by a distance substantially equal to that between the centre of attachment of the longer arm 21 of the bell crank lever to the lid and the pivoting axis 23 of such lever; similarly the replacement of the lid in the upper end of the charging hole is mechanically achieved by a reverse action of the said trip member 27 exerted upon the longer arm 21 of the bell crank lever 22 in such a way as to swing the latter lever in the opposite direction to that in which it was moved when lifting the lid from the charging hole.

The trip member 27 is adapted for reciprocation in a horizontal path over the top of the battery, in order to advance it towards or withdraw it from the charging hole 12, the trip member being arranged at right angles to the vertical medial planes of the ovens of the battery and, in the embodiment being described, comprises a horizontal rod carried at its opposite ends by a pair of laterally spaced identical trip levers 28 (see Figures 1, 3, 4, 5 and 6) of substantially isosceles triangular shape in side elevation, these trip levers being fixed at their apices to the opposite end portions of a rockable trip shaft 29 so that the trip levers are capable of swinging in vertical planes. The trip rod 27 is located at the lower ends of the base portions of the said isosceles triangular shaped trip levers 28 and the rockable trip shaft 29 is journalled in bearings 30 carried on the underside of an auxiliary carriage 31 supported on and below the chassis 4 of the larry car 2, such carriage being reciprocable relatively to the larry car in the direction of the length of the latter, i.e. in the direction of the length of the coke ovens themselves.

The auxiliary carriage 31 comprises a pair of parallel laterally spaced longitudinal frame members 32 extending in the direction of the length of the larry car and connected together by two or more spaced parallel transverse members 33, these longitudinal and transverse members conveniently being formed of channel section metal. This frame is carried upon transverse outwardly extending stub axles 34 and 35 provided on frame members 32 and provided with rollers 36 and 37 which run in channel section guide members or rails 38 and 39 carried by the frame 4, and extending substantially the full length of the larry car, the length of this car being the dimension of the car measured across the battery.

As previously indicated there is a bell crank lever 22 on each charging hole lid and one of the auxiliary carriages 31 is provided for each of the three charging holes of an oven, and each of the auxiliary carriages is independently reciprocable longitudinally of the larry car, such reciprocation conveniently being achieved in each case through the medium of a pair of hydraulic double acting rams and cylinder assemblies of which the cylinders 40 are secured to the guide members 38 and 39 whilst the rams 41 are secured to the auxiliary carriage, the necessary fluid pressure being supplied through hoses 42 and derived from any appropriate source and preferably through the medium of a hydraulic reservoir (not shown). The operation of the said hydraulic cylinder and ram assemblies is conveniently controlled by press button means located in a cab 43 of the larry car. The reciprocation of the auxiliary carriages could, of course, be achieved in other ways, e.g. electrically.

Normally each auxiliary carriage 31 will, as shown in Figure 4, be situated on the larry car so that the trip rod 27 is situated transversely of the coke oven below the larry car and to one transverse side of the vertical centre line of the charging hole and of lever arm 26 of the bell crank lever 22 of the lid 16 with which it is to co-operate. Moreover, the said triangular trip levers 28 will depend from their carriage 31 to a predetermined and limited extent such that the trip rod 27 will be held at such a level above the top of the battery, assuming the charging lid to be closed, that the advancement of the leading end of the auxiliary carriage longitudinally of the larry car and towards and beyond the centre line of the said charging hole, will cause the trip rod first to engage under the tip of the shorter arm 26 of the bell crank lever 22 and then to travel along the inner edge of this arm and the bell crank lever to swing about its pivot and the longer arm 21 of this lever to lift the charging hole lid, the bell crank lever swinging altogether through an obtuse angle sufficient to bring the shorter arm 26 of the lever into contact with, or closely adjacent to, the top of the battery as shown in dot and dash lines at 44 in Figure 4 and full lines in Figure 6, when the charging lid will be in a full inverted position ready for cleaning and well transversely to one side of its charging hole.

If the auxiliary carriage 31 were now to be returned to its original position the trip rod 27 would engage under the inner edge of the other longer, and now upper, arm 21 of the bell crank lever 22 and return the latter to its original position, thereby replacing the charging hole lid 16 in its seat in the frame 25 of the charging hole 12.

Conveniently, the extent to which the said triangular trip levers 28 can descend with respect to the said auxiliary carriage 31 is limited by laterally extending stop lugs 45 provided on the top of the trip levers and adapted, when these levers are in their lowermost positions, to engage the top edges of the adjacent longitudinal members 32 of the frame of the auxiliary carriage 31.

It is frequently necessary (for scurfing or other purposes) to open at least one charging hole of each oven chamber when it is discharged, and to leave it open for some time and yet to be able to return the corresponding auxiliary carriage 31 transversely to its original position on the larry car after opening the charging hole. For this purpose means are provided whereby the said triangular trip levers 28 can raise the trip rod 27 entirely above the arms 21 of the inverted bell crank levers 22 and thus render the trip rod temporarily inoperative before the return of the auxiliary carriage to its original position. The means for raising the said triangular trip levers comprise a rotary power unit conveniently in the form of a vane type hydraulic actuator 46 (Figures 3, 4 and 6) mounted on the top of the auxiliary carriage 31, although any other suitable type of actuator, e.g. a pneumatic or electric unit, could be employed for this purpose. The actuator has a horizontal shaft 47 to which is fixed one end of a lever arm 48 to the other end of which is pivoted one end of a link 49 having its opposite end pivoted to a lever arm 50 fixed upon the rockable trip shaft 29 carrying the triangular trip levers 28, so that rotation of the actuator shaft 47 will raise or lower said triangular trip levers according to the direction of such rotation. The actuator is conveniently controlled from the cab 43 of the larry car by a push button device (not shown).

Thus if it is desired to open and then leave open one or more charging holes for some time while the larry car is moved away from the oven in which the charging hole has been opened, then the corresponding auxiliary carriage or carriages 31 is moved back to the normal or original position on the larry car, with the triangular trip levers 28 raised during this return movement as above explained so as not to close the charging holes selected.

If such a procedure is followed, then on once again bringing the larry car back to the oven in which the charging hole was left open, for the purpose of removing the lid of the other of the charging holes and then charging the oven, the auxiliary carriage 31 which corresponds to the charging hole of which the lid has been previously removed, will be moved with the other auxiliary carriages 31 in the charging lid removing direction but with the trip rod 27 now released and back in its normal position to ride upwardly over the inverted charging hole lid 16, as indicated in dot and dash lines at 51, Figure 6, and then drop over the extremity of the lid into the full line position shown in Figure 6, to a position ready for operating on the underside of the arm 21, to close the charging lid when the auxiliary carriage 31 is moved transversely back to its normal or original position during subsequent charging lid replacing operations.

It is desirable to provide in combination with each of the charging hole lid removing and replacing means of the form above described, an intermediate chute 52 for conveying coal from the outlet of the discharge chute 8 of the coal container of the larry car to the charging holes, such intermediate chute being likewise displaceable transversely to one side of the chute 8 when not required for oven charging but being capable of being brought transversely into registration with the chute 8 and the corresponding charging hole when charging is to be effected after the charging hole lid has been removed.

Thus in an apparatus as above described, each intermediate chute 52 is individually carried by one of the auxiliary carriages 31 and comprises a tubular member arranged with its axis vertical, the chute being flared at its upper end 53 to a diameter exceeding the diameter of the outlet of the discharge chute 8 of the corresponding coal container. The intermediate chute extends above and depends below the auxiliary carriage 31 and is fixed by brackets 54 to the upper side of this carriage.

Each of the intermediate chutes 52 is formed with an extension trunk 55 coaxially and telescopically mounted about the lower end of the intermediate chute 52 so as to be raised or lowered vertically with respect to this chute 52, the trunk 55 having at its lower end a terminal part 56 adapted to fit into the mouth of a charging hole when the trunk is lowered so as to convey coal directly from the intermediate chute 52 into the charging hole and substantially to preclude the possibility of coal escaping on the top of the battery around the charging hole during the actual feeding of the coal into the charging hole.

The lower part of the said extension trunk is furnished with a sealing rim 57 adapted to seat in the flared mouth of the corresponding charging hole when the trunk is lowered into the latter.

The terminal part 56 of the extension trunk 55 is formed separately of the upper portion of the latter and is furnished at its upper end with an outwardly directed flange 59 located in an annular internal groove 60 in an external circumferential flange on the lower end of the upper part of the trunk in such a manner that the terminal part 56 may move to a limited extent transversely, but not axially, with respect to the upper portion of the trunk 55 for self-centering the extension part in a charging hole.

The sealing of the self-centering terminal part 56 of the trunk 55 in the flared mouth of a charging hole is assisted by outwardly and upwardly chamfering the lower edge 62 (Figure 4) part of this terminal part and by bevelling the outwardly directed peripheral flange 57 around its circumference, the bevelled edge of this flange seating in the upper part of the flared mouth of the charging hole whilst the chamfered lower edge 62 of the terminal part of the trunk seats in such flared mouth at a level lower than the said flange.

For the purpose of raising and lowering each trunk 55 as and when required, an actuator 63 is provided on the upper side of the corresponding auxiliary carriage 31, this actuator conveniently being of the rotary vane hydraulic type previously referred to and having a horizontal shaft 64 rigidly carrying a crank or lever arm 65 connected by a link 66 to a similar lever arm 67 fixed upon one end of a trunk raising and lowering shaft 68 extending across the said auxiliary carriage frame and furnished with a pair of spaced parallel trunk lifting levers 69 each fixed at one end to the shaft and each pivotally connected at the other end to the upper end of a depending link 70 anchored at its lower end pivotally to one side of the trunk 55, there being one of these dependent links 70 at each of two diametrically opposite positions around the periphery of the trunk. The trunk lifting and lowering actuator 63 is, like the other actuator 46, preferably operated from a push button control device in the cab 43 of the larry car.

Each of the auxiliary carriages 31 is preferably independently reciprocable, but any suitable over-riding control (not shown) may be provided, if desired, for effecting corresponding adjustment of all of the auxiliary carriages simultaneously. Moreover although the trip mechanism 28 and the trunk raising and lowering mechanism 70 of each of the auxiliary carriages 31 are also independently operable, over-riding control means may be provided whereby such trip mechanisms may be operated simultaneously and whereby the trunks 55 of the said intermediate chutes 52 may also be operated simultaneously, if desired.

Where an oven has three charging holes, it will be desirable for two of the auxiliary carriages (for example the centre and left hand carriages seen in Figure 1) to be movable transversely of the battery in one direction to effect the removal of the charging hole lids 15 and 16 of the two charging holes 11 and 12, whilst the third auxiliary carriage 31 is movable transversely in the opposite direction for the removal of the lid 17, of the third charging hole 13.

Assuming that the contents of an oven have been carbonised and it is desired to push the oven and recharge it, then the sequence of operations will generally be as follows: The larry car 2 is moved up to the oven in question and arranged with the outlets of the discharge chutes 8, 9 and 10 of the coal containers 5, 6 and 7 in register axially with the charging holes 11, 12 and 13 of the oven, the valves to the gas mains (not shown) are closed and the ascension pipe caps (also not shown) opened, the centre charging hole lid 16 will be opened by appropriately transversely adjusting the centre auxiliary carriage 31 on the larry car relative to the charging hole; the trip rod 27 on the centre auxiliary carriage 31 is then disengaged by actuator 16 from its position to operate the bell crank lever 22 so as to avoid closing the removed centre charging hole lid 16, and the auxiliary carriage then returned to its original position after which the charging larry car will be moved to another oven thus allowing for degasing the newly opened oven.

Subsequently the larry car will be returned to the oven over which it was first placed and all the auxiliary carriages 31 operated to move them in the charging hole lid-removing direction so that the lids 15 and 17 that have not lifted will be lifted and inverted; the centre auxiliary carriage will at this time make a movement similar to the others without affecting the corresponding charging hole lid, as hereinbefore explained.

Movement of the auxiliary carriages 31 in this way will bring all the said trunks 55 transversely into axial alignment respectively with the charging holes 11, 12 and 13 and with the outlets of the discharge chutes 8, 9 and 10 of the coal containers 5, 6 and 7 and the appropriate actuators 63 are operated to drop these trunks 55 into the charging holes, whereafter charging of the oven can be effected. After charging of the oven and levelling of the coal has been completed, the said extension trunk 55 will be withdrawn from the charging holes, the auxiliary carriages 31 operated transversely to move the intermediate chutes 52 and extension trunks 55 aside and to replace the charging hole lids, the latter are then sealed in their charging holes, the valves to the gas main opened and the ascension pipe caps closed, and the larry car withdrawn from the charged oven.

In the alternative embodiment of the invention, shown in Figures 7 and 8, instead of the charging hole lids being carried by pivoted bell crank levers as hereinbefore described, they are entirely separable from the battery as charging hole lids have been in the past. Thus each lid 16a is furnished in the upper side and along a diameter thereof with a channel across which extends at least one cross bar, stirrup or similar device 71 under which there may be engaged the leading slightly hooked end of a cranked lid lifting arm 72 fixed upon a shaft 73 pivotally mounted on the auxiliary carriage 31 such as that above described on the larry car, the lifting arm being pivotal in a vertical plane with respect to such carriage by power actuated means such as a hydraulic rotary vane actuator 74 operating through crank arms 75, 75' and a link 76, the arrangement being such that the lid lifting lever 72 may be lowered and its leading end 77, engaged as aforesaid below the cross bar 71 of the lid by the transverse advancing the auxiliary carriage 31 towards the lid, whereafter the lid may subsequently be raised from its charging hole by raising the lifting lever by the operation of the actuator 74. If the auxiliary carriage 31 is now withdrawn from the charging hole the lid on the lifting lever will be carried to one side of the charging hole (as indicated in dot-and-dash lines at 78) where the lid may be deposited on to the top of the battery by again lowering the lifting lever 72 which may be then disengaged from the lid if desired by then still further transversely withdrawing the auxiliary carriage 31. The lid may be replaced in the charging hole by reversing the procedure above explained.

The auxiliary carriage 31 may in this case be reciprocated relatively to the larry car 2 by hydraulic ram assemblies as previously described or by any other appropriate means such as, for example, a rack 79 on the carriage and a pinion 80 fixed upon a transverse shaft 81 carried by the rails 38, 39 for the carriage and driven by a motor 82 through reduction gearing 83, the motor 82 being controlled from the cabin 43.

With this modified arrangement it is preferred to have each of the intermediate chutes 52 and the trunks 55 thereon mounted directly on the discharge chutes 8 of the coal containers instead of on the auxiliary carriages 31, mechanisms not shown but conveniently similar to that illustrated in Figures 11 and 12 and later hereinafter described for lifting and lowering the trunks 55 being mounted on the larry car instead of on the auxiliary carriages 31.

In the modification shown in Figures 9 and 10 of the last described Figs. 7 and 8 embodiment of the invention, the lid lifting levers are of an alternative form.

Thus these levers 72a, instead of engaging under a cross bar 71 or the like on a charging hole lid, are adapted to be hooked or engaged over the upper side of a said bar or the like, by lowering the lever 72a onto the latter, the levers having undercut or dovetail shaped recesses 84 on the undersides of their leading ends adapted to receive said cross bars or the like, whereafter transverse traversal of the auxiliary carriage 31 in a direction away from the charging hole of which the lid is to be removed, will cause the lid 16a to be pulled from the charging hole in a manner very similar to that in which a charging hole lid is removed manually by means of the normal hooked tool used by operators as hereinbefore described. The charging hole lid may similarly be pushed by the lifting lever 72a, back into position in the charging hole in a manner substantially opposite to that in which the lid was removed.

In this embodiment of the invention and, if desired, also in the embodiment described with reference to Figures 7 and 8, the lifting lever 72a or 72 may be duplicated or of a double construction as shown in Figure 10 so as to engage the cross bar or bars or the like 71 on the lid at two positions diametrically spaced across the lid thereby to maintain a better control on the movement of the lid whilst it is being removed from, or replaced in, a charging hole.

In the embodiment of the invention illustrated in Figures 9 and 10, the auxiliary carriage 31 is shown as being reciprocable by means of a hydraulic ram and cylinder assembly.

Figure 12:
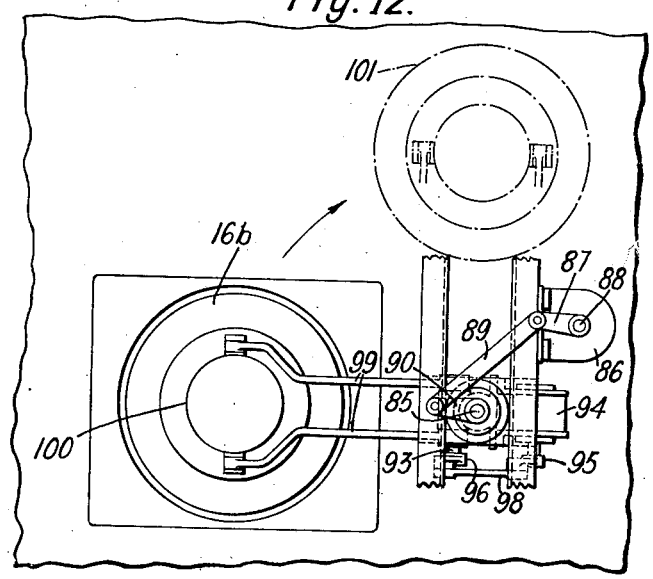
Figure 12 is a sectional plan taken on line XII—XII, Figure 11.

In a still further embodiment of the invention as shown in Figs. 11 and 12, instead of the charging lid being lifted or raised by lever means which mechanically interengage with (e.g. the aforementioned bell crank levers 22) the cross bar 72 or 72a attached to or on the lids, the lids are lifted by electro-magnets, means being provided for lowering an electro-magnet into engagement with a lid to be raised, for energising the magnet and for then raising it to lift the lid from the charging hole, whilst means are also provided for moving the magnet and the lid carried thereby transversely aside and away from the charging hole. The movement of the transverse lid aside from the charging hole may be achieved by mounting the electro-magnet raising and lowering means upon an auxiliary carriage 31 such as described above, or merely by arranging for the said raising and lowering means of the electro-magnet to be transversely swingable about a vertical fixed axis spaced from the vertical axis of the magnet itself and carried on the larry car.

One electro-magnetic lid removing and replacing arrangement of the character just described is illustrated in Figures 11 and 12. In this arrangement the larry car 2 is furnished to one side of or behind each of its coal container discharge chutes 8 with a vertical shaft 85 journalled for rotation about its own axis by a vane type hydraulic actuator 86 or other appropriate power unit. In the case illustrated the hydraulic actuator 86 operates upon the vertical shaft 85 through a crank arm 87 on the actuator shaft 88 and connected by a link 89 to a similar crank arm 90 fixed upon the shaft 85.

The lower end of the shaft 85 rigidly carries a sleeve 91 having at one side a journal 92 for a magnet lifting and lowering horizontal shaft 93 and on its opposite side a rotary vane type hydraulic actuator 94 for rotating the shaft 93 in its journal through the medium of cranks 95 and 96 respectively fixed upon the actuator shaft 97 and the magnet lifting and lowering shaft 93 and connected together by a link 98.

On the said magnet lifting and lowering shaft 93 are fixed at spaced positions one end of each of a pair of parallel levers 99 extending from the shaft at right angles thereto, these levers being joggled outwardly and the ends thereof remote from the shaft 93 pivoted at diametrically opposite positions to the cylindrical housing of an electro-magnet 100. Thus the electro-magnet 100 can be raised or lowered vertically with respect to a charging hole lid 16b with which it is registered and it can also be tranversely swung about the axis of the vertical shaft 85 so that the magnet may, after having registered with a charging hole lid, be lowered on to this lid, energised to attract the lid to itself, raised, and then swung aside, conveniently through 90° as indicated at 101 in Figure 12, to take the charging hole lid out of the path of the trunk 55 of the intermediate chute 52 on the coal container discharge chute 8 so that the trunk may be lowered into the charging hole, the intermediate chute being carried by the said discharge chute 8 as described with reference to Figures 7 and 8. The replacement of the charging hole lid in position in the charging hole is achieved in a manner the reverse of that above described, and it should be understood that after the removal of the lid from the charging hole and the swinging aside of the lid, the electro-magnet can be lowered to deposit the lid on the battery top and then be disengaged from the lid if so desired by de-energising the electro-magnet.

Since the charging hole lids and the frames in which they seat are usually made of magnetic material, it is desirable magnetically to insulate these lids from the electro-magnet used for raising them. For this purpose it is convenient to provide on each lid such as the lid 16b a lifting plate 105 made of magnetic material but insulated from the lid by a sheet of non-magnetic material 106 and secured to the lid by non-magnetic connecting bolts (not shown), the lifting plate 105 being appropriately spaced by a rim 107 above the top of the lid to provide an air filled cavity 108. The said non-magnetic insulating material may be of any suitable form and may be of a solid or openwork form or may even consist primarily of an air gap, the magnetic lifting plate then being spaced from the charging hole lid merely by non-magnetic bolts or other spacers.

The trunk 55 may be raised and lowered by a mechanism similar to that described with reference to Figures 1 to 6, the mechanism being arranged on the larry car 2 instead of on an auxiliary carriage which is not used in the construction shown in Figures 11 and 12. Thus a hydraulic actuator 63a may be carried by the larry car and actuate the trunk 55 through a crank 65a, link 66a, cranks 102 and 103 fixed on a shaft 104 carried by the larry car, and links 70a.

In the embodiments of the invention above described with reference to Figures 1 to 6, 7 and 8 and 9 and 10 the auxiliary carriages 31 are arranged for traversal upon the larry car 2 in the direction of the length of the latter and thus of the lengths of the ovens of the battery; however the auxiliary carriages could be arranged to be moved transversely of the lengths of the larry car and the coke ovens if desired.

Although the invention has been described with particular reference to horizontal coke oven batteries it should be understood that it may be used in other forms of installation as previously mentioned herein. It should also be understood that although in describing the alternatives to and modifications of the first embodiment herein referred to, nothing has been said about the push button or like controls for the various mechanisms, all these arrangements may be included in the alternative and modified embodiments of the invention, if desired.

We claim:

1. A larry for top charging the ovens of a horizontal coke oven battery, comprising: a larry car movable along the battery top into and out of position for top charging the oven chambers of the battery through charging holes in the roofs of the oven chambers, hoppers mounted on the car with bottom outlets to register with the charging holes of the ovens, charging hole lid handling means for engaging and removing the charging hole lids of the ovens, and supporting means for said charging lid handling means, said supporting means being mounted on the larry car for movement therewith from oven to oven along the battery top, and being transversely movable relative to the bottom outlets of the hoppers to shift the lid handling means laterally into and out of the path of flow of material from the bottom outlets of the hoppers to the charging holes of the ovens, for restoring and removal of the lids in relation to the charging holes of the respective ovens while the bottom outlets of the larry hoppers are in register with the charging holes of the respective ovens, and wherein the charging hole lids are carried by lever means pivotally mounted on the battery top alongside the charging hole the lid is to close, and wherein the lid handling means comprises trip means for tilting the lever means of a charging hole lid around its pivot for removing the lid from its charging hole and moving it aside from such hole.

2. Apparatus according to claim 1, wherein the said trip means are also adapted for reversely engaging a said lever means in its opened position to tilt it back for replacing the opened charging hole lid in its charging hole.

3. Apparatus according to claim 1, wherein the charging hole lids are carried by one arm of a double arm bell crank lever pivoted to the said battery top for swinging in a vertical plane, and the two arms of the bell crank lever are adapted for co-operation with the trip means on the larry car, and the trip means have their supporting means mounted for reciprocation in lateral guide means on the larry car for alternatively advancing such trip means laterally towards and withdrawing it laterally from the bell crank lever, the trip means being adapted on advancement towards the bell crank lever, to engage one arm of the latter and tilt it to thereby raise and then invert the charging hole lid to one side of its charging hole, and on subsequent withdrawal of the trip means with respect to the bell crank lever, the trip means are adapted to operate on the second arm of such lever and tilt it reversely to replace the previously removed lid back in its charging hole.

4. Apparatus according to claim 3, wherein means are provided for rendering the said trip means inoperative for reversely tilting the said bell crank lever during the withdrawal of the trip means relative to the bell crank lever, whereby the larry car may then be moved away from that charging hole without closing the lid to leave the charging hole open for scurfing or other purposes.

5. A larry for top charging the ovens of a horizontal coke oven battery, comprising: a larry car movable along the battery top into and out of position for top charging the oven chambers of the battery through charging holes in the roofs of the oven chambers, hoppers mounted on the car with bottom outlets to register with the charging holes of the ovens, charging hole lid handling means for engaging and removing the charging hole lids of the ovens, and supporting means for said charging lid handling means, said supporting means being mounted on the larry car for movement therewith from oven to oven along the battery top, and being transversely movable relative to the bottom outlets of the hoppers to shift the lid handling means laterally into and out of the path of flow of material from the bottom outlets of the hoppers to the charging holes of the ovens, for restoring and removal of the lids in relation to the charging holes of the respective ovens while the bottom outlets of the larry hoppers are in register with the charging holes of the respective ovens, and wherein the said lid handling means comprises a lever pivotally mounted on its said supporting means and adapted at one end to engage a charging hole lid, and wherein means are provided on the larry car for raising and lowering such end of the lever to unseat and seat a charging hole lid.

6. Apparatus according to claim 5, wherein the bottom outlet of each hopper of the larry car has an intermediate chute with a raisable and lowerable extension trunk, the lower end of which may be dropped or lifted from a charging hole with which the trunk is registered, and wherein power-operated means are provided on the larry car for moving the chute into and out of registration with the bottom outlets.

7. Apparatus according to claim 6, wherein said intermediate chute and extension trunk assembly is mounted on an auxiliary carriage arranged on the larry, and means are provided for moving said carriage relatively to the larry car to move the chute assembly into or out of registration between a charging hole for which a lid is to be removed and the bottom outlet of a hopper on the larry car.

8. Apparatus according to claim 6, wherein said auxiliary carriage also carries the lid handling means and the arrangement of the lid handling means and the chute and trunk on said carriage is such that, in effecting the removal of a charging hole lid from its charging hole and laterally displacing such lid transversely with respect to such hole, the said chute assembly is automatically aligned with said charging hole hopper bottom outlets.

References Cited in the file of this patent

UNITED STATES PATENTS

| | | |
|---|---|---|
| 1,382,916 | Johnson et al. | June 28, 1921 |
| 1,609,919 | Underwood | Dec. 7, 1926 |

FOREIGN PATENTS

| | | |
|---|---|---|
| 905,131 | Germany | Feb. 25, 1954 |